(12) United States Patent
Moriyoshi

(10) Patent No.: US 9,414,065 B2
(45) Date of Patent: Aug. 9, 2016

(54) DYNAMIC IMAGE DISTRIBUTION SYSTEM, DYNAMIC IMAGE DISTRIBUTION METHOD AND DYNAMIC IMAGE DISTRIBUTION PROGRAM

(75) Inventor: Tatsuji Moriyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 451 days.

(21) Appl. No.: 13/882,378

(22) PCT Filed: Oct. 31, 2011

(86) PCT No.: PCT/JP2011/075525
§ 371 (c)(1),
(2), (4) Date: Apr. 29, 2013

(87) PCT Pub. No.: WO2012/060459
PCT Pub. Date: May 10, 2012

(65) Prior Publication Data
US 2013/0215016 A1  Aug. 22, 2013

(30) Foreign Application Priority Data

Nov. 1, 2010 (JP) .................................. 2010-245175

(51) Int. Cl.
*H04N 7/12* (2006.01)
*H04N 7/26* (2006.01)
*H04N 11/02* (2006.01)
(Continued)

(52) U.S. Cl.
CPC ....... *H04N 19/00903* (2013.01); *H04N 19/132* (2014.11); *H04N 19/164* (2014.11); *H04N 19/167* (2014.11); *H04N 19/174* (2014.11);
(Continued)

(58) Field of Classification Search
CPC . H04N 7/50; H04N 7/26351; H04N 7/26643; H04N 7/462; H04N 7/26276
USPC ............... 375/240.01, 240.1, 240.12, 240.16, 375/240.24–240.27
See application file for complete search history.

(56) References Cited

U.S. PATENT DOCUMENTS

| 5,867,208 A | 2/1999 | McLaren |
| 6,539,545 B1 | 3/2003 | Dureau et al. |

(Continued)

FOREIGN PATENT DOCUMENTS

| JP | 11-205786 A | 7/1999 |
| JP | 2001-522175 A | 11/2001 |

(Continued)

OTHER PUBLICATIONS

International Search Report of PCT Application No. PCT/JP2011/075525 mailed on Feb. 21, 2012.
(Continued)

*Primary Examiner* — Jamie Atala
*Assistant Examiner* — On S Mung

(57) ABSTRACT

A dynamic image distribution system manages compression-encoded dynamic images as a group of tiles, each containing at least one macro block. The dynamic image distribution system is provided with: a transmitter for managing the display region of the dynamic image and, on the basis of the display region, reads a tile from the stored group of tiles and subjects the tile to correction processing, before synthesizing and transmitting a dynamic image bit stream of one frame from the processed tile; and a receiver for receiving and decoding the dynamic image bit stream, displaying the decoded dynamic image, inputting a user operation and transmitting the user operation to the transmitter.

7 Claims, 17 Drawing Sheets

(51) Int. Cl.

| | | |
|---|---|---|
| *H04N 11/04* | (2006.01) | |
| *H04N 19/85* | (2014.01) | |
| *H04N 19/513* | (2014.01) | |
| *H04N 19/61* | (2014.01) | |
| *H04N 19/132* | (2014.01) | |
| *H04N 19/164* | (2014.01) | |
| *H04N 19/174* | (2014.01) | |
| *H04N 19/167* | (2014.01) | |
| *H04N 19/40* | (2014.01) | |

(52) U.S. Cl.
CPC ............. *H04N 19/40* (2014.11); *H04N 19/513* (2014.11); *H04N 19/61* (2014.11); *H04N 19/85* (2014.11)

(56) References Cited

U.S. PATENT DOCUMENTS

| 6,931,660 | B1 | 8/2005 | Kalluri et al. |
| 2003/0142872 | A1 | 7/2003 | Koyanagi |
| 2007/0009035 | A1* | 1/2007 | Craig et al. ............... 375/240.16 |
| 2007/0009043 | A1* | 1/2007 | Craig et al. ............... 375/240.24 |

FOREIGN PATENT DOCUMENTS

| JP | 2002-27461 | A | 1/2002 |
| JP | 2003-224846 | A | 8/2003 |
| JP | 2003-333595 | A | 11/2003 |
| JP | 2003-339003 | A | 11/2003 |
| JP | 2005-341093 | A | 12/2005 |
| JP | 2007-189357 | A | 7/2007 |
| JP | 4188599 | B2 | 9/2008 |

OTHER PUBLICATIONS

ITU-T Recommendation H.264, "Advanced video coding for generic audiovisual services", Series H: Audiovisual and Multimedia Systems, Infrastructure of audiovisual services—Coding of Moving video, ITU-T Telecommunication Standardization Sector of ITU, Mar. 2005.

* cited by examiner

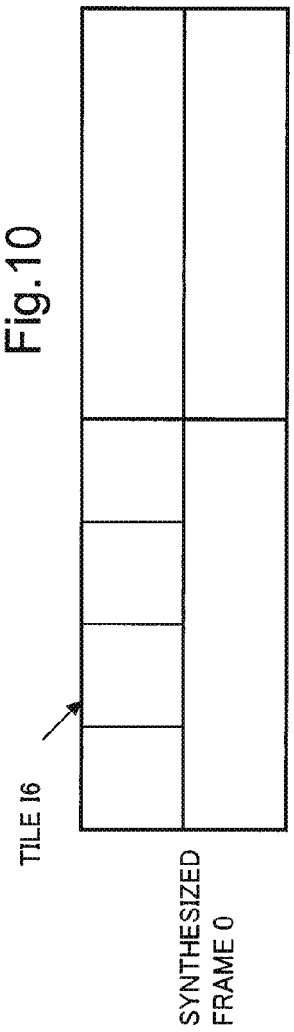
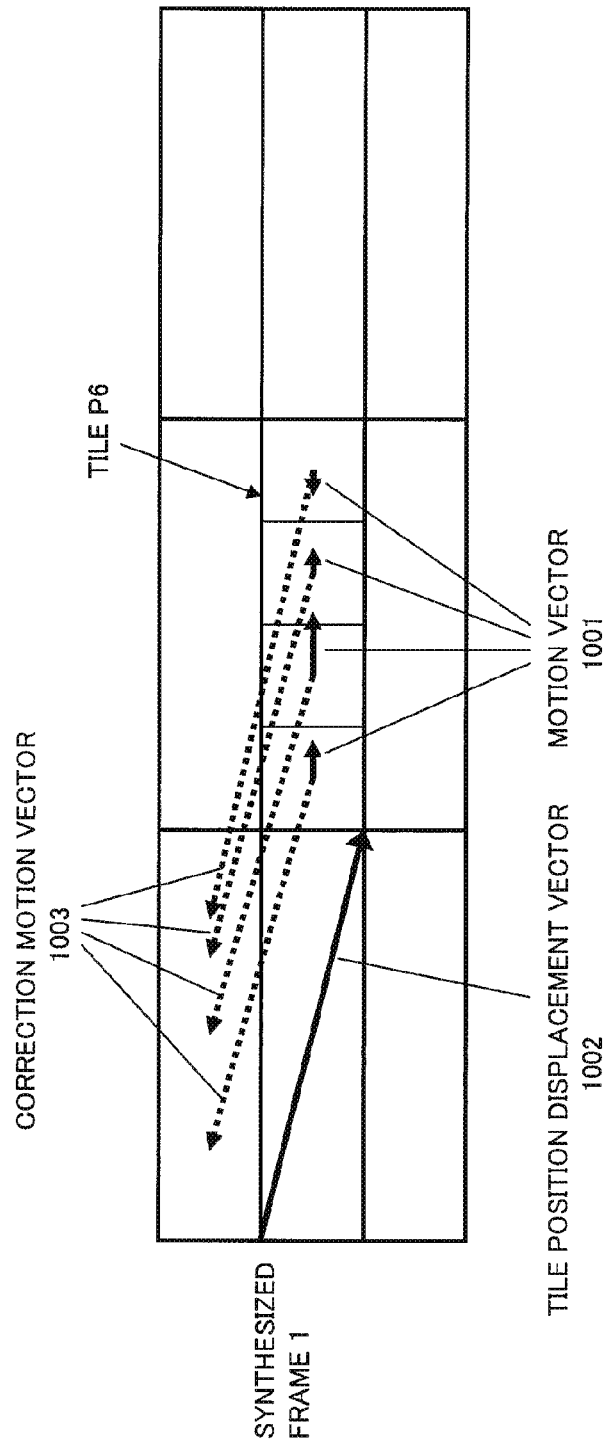
Fig.10

DYNAMIC IMAGE DISTRIBUTION SYSTEM, DYNAMIC IMAGE DISTRIBUTION METHOD AND DYNAMIC IMAGE DISTRIBUTION PROGRAM

This application is a National Stage Entry of PCT/JP2011/075525 filed Oct. 31, 2011, which claims priority from Japanese Patent Application 2010-245175 filed Nov. 1, 2010, the contents of all of which are incorporated herein by reference, in their entirety.

TECHNICAL FIELD

The present invention relates to a dynamic image distribution system, a dynamic image distribution method and a dynamic image distribution program, and in particular relates to a dynamic image distribution system, a dynamic image distribution method and a dynamic image distribution program that can arbitrarily set a viewing range and interactively change the viewing range.

BACKGROUND ART

In recent years, digitalization of dynamic image data has developed, and performing compression coding for a dynamic image signal to treat has become general. As a technology for coding a dynamic image signal with a low bit rate, a high compression rate, and high definition, to generate coding data, or decoding the coded dynamic image, H.261 and H.263, standardized by the ITU (International Telecommunication Union), MPEG-1 (Moving Picture Experts Group-1), MPEG-2 and MPEG-4 by the ISO (International Organization for Standardization), and VC-1 by the SMPTE (Society of Motion Picture and Television Engineers) are listed. These technologies are widely employed as the international standards. Furthermore, there is H.264/MPEG-4 AVC, which ITU and ISO have standardized jointly in recent years (See non-patent document 1). This H.264 has been known to provide compression efficiency and an image quality, which are better than a related dynamic image coding technology.

In these dynamic image coding technologies, in order to compress a dynamic image signal efficiently, interframe predictive coding technology using temporal correlation between respective frames is widely used. In the interframe predictive coding, an image signal of a present frame is predicted from an image signal of a frame which has been already coded, and a prediction error signal, between the predicted signal and a present signal, is coded. Because a high correlation exists between the image signals of temporally adjacent frames in the case of a general dynamic image, this technology is effective for improving the compression efficiency. In the dynamic image coding technologies, such as the above-mentioned MPEG-1, MPEG-2, MPEG-4 and H.264, the dynamic image is coded using I picture (intra frame coding image), which does not use the interframe predictive coding, P picture (one-way prediction encoded image) using the interframe predictive coding from one frame, which has already been coded, and B picture (bidirectional prediction encoded image) using the interframe predictive coding from two frames which, have already been coded, in combination. A frame of I picture can be decoded independently in the case of decoding. However, because the P picture and the B picture require, in advance, image data to be used for a prediction in the interframe prediction for decoding, the independent decoding for one frame cannot be performed.

The dynamic image compression technology, such as above-mentioned MPEG-2 and H.264, is used for many usages, such as a digital broadcasting, an image distribution via an optical disk medium and an image delivery via the internet or the like.

Though accumulation of a dynamic image, and transmission thereof or the like has become facilitated by these dynamic image compression technologies, different from the incompressible image, interactive processing such as viewing by cutting out only a certain area of an image and changing a viewing range dynamically cannot be realized easily.

In recent years, demands for making a screen larger and for making definition of an image higher have been increasing, and a resolution (1920×1080 pixels, 1280×720 pixels or the like) higher than a related art, called HD (High Definition), is becoming a mainstream in an image used for the broadcasting, the image content sale via an optical disc and the image delivery. Furthermore, a measure for images with higher definition of 4K×2K (4096×2048 pixels), 8K×4K (8192×4096 pixels) or the like has also been developed. On the other hand, scenes of viewing an image content is increasing, and a demand for viewing an image in a various screen size, a distance to a screen and ambient surroundings, such as viewing an image on a small size TV, viewing an image on a PC (personal computer), viewing an image on a cellular phone and viewing an image on a portable image player is increasing, besides watching an image on a big screen television (TV) in a home living room.

Here, assuming that, for example, when a high-resolution image of 8K×4K (8192×4096 pixels) is watched on a small size screen (640×480 pixels, for example) of a cellular phone, an object to see is displayed in a very small size compared with a background image when a whole image content is displayed entirely in accordance with the screen size, and a visual recognition of the object may be difficult. In such a case, instead of displaying the whole image content, cutting out a certain area only where a user has an interest and displaying the area will make the viewing comfortable. Moreover, changing interactively the display region in response to the user's request will lead further to improving the convenience for the user.

As an example, for an image of a soccer game, there is a style of viewing, in which an image of the whole stadium is recorded with high definition by 8192×4096 pixels, and on watching the image on a cellular phone, only a certain area around a goal or a player with a ball is cut out to be watched and the viewing range is changed appropriately as the player moves.

For uncompressed video signal, cutting out a certain area of an image as mentioned above will be easily realized. However, for the video signal, for which compression coding was performed, because the video signal has been coded by using spatial and temporal correlations in a dynamic image, cutting only a part of the video signal to be decoded and to be displayed is difficult. For example, performing the delivery of an image, which is an area of 640×480 pixels cut out from a video signal of 8192×4096 pixels, requires a processing with a method such as:

(A) the whole dynamic image of 8192×4096 pixels is transmitted, received and decoded, and a part of the uncompressed image of the decoding result is cut out, and displayed, or (B) the whole dynamic image of 8192×4096 pixels is decoded and an image of the area to be watched is cut out from uncompressed image of the decoding result, the coding processing is performed for data of the image in the area, the coded data is transmitted and received, and displayed.

However, the method (A) requires a high-performance decoding device capable of performing the decoding process for a dynamic image larger than the display size of the receiving device, and the transmission path band is unnecessarily consumed. Furthermore, in the method (B), because the decoding, cutting and coding processings are performed in the transmitter side, a decoding device and a high coding device require high performance. Furthermore, there is a problem that the coding devices, a number of which corresponds to the maximum number of the receivers connected simultaneously, must be provided.

Regarding the above-described problems, patent document 1 discloses a coupling technology of multiple MPEG coding video streams related to interactive video communication media such as an interactive television. In this technology, plural MPEG coding video streams are received, and a display position code corresponding to a display position on each slice for each video stream is corrected, if the correction process is needed. By interleaving each slice for each of the MPEG coding video streams including the video stream, changed as above, to a single synthesized video stream, the user can select and display the plural video streams on the TV set, and can select the display position on each of the plural video streams.

Furthermore, patent document 2 discloses a technology relating to a coding system for scrolling a coded MPEG still picture. In this technology, a compressed picture is divided into slices, so that an image can be scrolled smoothly, and only data of a slice corresponding to a range to be viewed is decoded and displayed. In the scroll operation, data of a slice which is not included in the image, which was viewed before, among ranges to be viewed, is added, and the data of the slice, which is not included in the range to be currently viewed, among the images viewed before, is deleted.

Furthermore, patent document 3 discloses a technology, in which a still picture is coded as I picture of MPEG when coding an image of scrolling a still picture in a longitudinal direction, and the coded picture is stored as a slice data whose header is deleted, and the I picture of MPEG is generated by adding a header to the slice data, which corresponds to the display region. Patent document 3 also discloses a technology, in which, in a subsequent picture, a motion vector reflecting a movement corresponding to the scrolling is generated, with reference to display data of a prior picture, and a new display region slice data is read and P picture of MPEG is generated for the display region, in which the prior picture has not been displayed.

RELATED ART DOCUMENT

Patent Document

[Patent document 1] Japanese Patent Publication No. 4188599
[Patent document 2] Japanese Translation of PCT International Application Publication No. 2001-522175
[Patent document 3] Japanese Patent Application Laid-Open No. 2002-27461
[Non-patent document 1] ITU-T Recommendation H.264, "Advanced video coding for generic audiovisual services", March, 2005

DISCLOSURE OF THE INVENTION

Problem to be Solved by the Invention

There is a problem, in the technology disclosed in patent document 1, that when a display position of a video stream is selected, the position thereof cannot be changed for each frame. This is because the coded image to be referred to, in the interframe predictive coding, needs to exist at an identical position in the frame, in the processing for cutting a video stream in each of the slices and synthesizing the video stream. Because the I picture is low in the compression efficiency compared with other P and B pictures, the I picture is used only at a frequency of about one frame in frames of from more than ten to several tens, for a usual dynamic image. Therefore, when the display position of the video stream is changed at a timing of the I picture, which does not use the interframe predictive coding, there is a problem that a flexibility for changing the display position becomes low.

In the technology disclosed by patent document 2, only a still picture can be dealt with using only an MPEG I picture. This corresponds to the purpose of the technology of patent document 2 to view a large still picture by scrolling, and there is a problem in applying the technology to viewing the usual dynamic image. Although a dynamic image can be dealt with as continuation of a still picture, the overall compression efficiency dramatically falls, in the technology of only using the I picture because the I picture has a low compression efficiency compared with other P and B pictures, and an effect of the dynamic image compression technology can not be expected.

Furthermore, although the technology disclosed in patent document 3 is also a technology suitable for performing the scrolling display for a still picture larger than the display size, it cannot be applied to a usual dynamic image. P picture is also used in the technology of patent document 3, but this is to represent a displacement of the display position of the picture displayed before. Although the P picture is easily applicable to generation of a motion vector corresponding to the amount of scrolling, the P picture is not applicable to a video signal of a usual dynamic image, in which a motion vector and an interframe prediction error signal are coded. For this reason, there is a problem that the technology of patent document 3 also cannot respond to the scrolling view of the usual dynamic image.

Thus, in the technologies disclosed in patent documents 1 to 3, efficient realization for cutting out the viewing range and for scrolling the view of a usual dynamic image coded by using I, P and B pictures is impossible.

An object of the present invention is to provide a dynamic image distribution system, a dynamic image distribution method and a dynamic image distribution program enabling the arbitrary setting of a viewing range for compression-encoded dynamic images and the interactive modification of the viewing range.

Means for Solving Problem

A dynamic image distribution system, according to the present invention, for managing a compression-encoded dynamic image as a set of tiles including one or more macro blocks, the system comprising: a transmitter, comprising: a tile storing means for storing a set of tiles configuring a dynamic image; one or more stream correcting means for reading a tile from the tile storing means, performing a correction process, and outputting; a synthesizing means for synthesizing a frame of dynamic image bit stream from the tile outputted from the stream correcting means and transmitting; and a display position control means for managing a display region in the dynamic image, and controlling the stream correcting means and the synthesizing means based on the display region; and a receiver, comprising: a decoding means for receiving and decoding the dynamic image bit stream; a display means for displaying the dynamic image decoded by the decoding means; and an operation input means for inputting a user's operation, and transmitting to the display position control means of the transmitter.

The dynamic image distribution method, according to the present invention, for managing a compression-encoded dynamic image as a set of tiles including one or more macro blocks and distributing to a receiving side from a transmission side, the method comprising: in the transmission side, a step of storing a set of tiles which configure a dynamic image; a step of reading a stored tile, performing a correction process, and outputting; a step of synthesizing a frame of dynamic image bit stream from the outputted tile, and transmitting; and a step of managing a display region in the dynamic image; and in the receiving side, a step of receiving and decoding the dynamic image bit stream; a step of displaying the decoded dynamic image; and a step of inputting a user's operation, and transmitting to the transmission side.

The dynamic image distribution program, according to the present invention, for managing a compression-encoded dynamic image as a set of tiles including one or more macro blocks and distributing to a receiving side from a transmission side, the program includes processing performed by a computer, the processing comprising: in a transmission side, processing of storing a set of tiles which configure a dynamic image; processing of reading a stored tile, performing a correction process and outputting; processing of synthesizing a frame of dynamic image bit stream from the outputted tile, and transmitting; and processing of managing a display region in the dynamic image; and in the receiving side, processing of receiving and decoding the dynamic image bit stream, and decoding; processing of displaying the decoded dynamic image; and processing of inputting a user's operation, and transmitting to the transmission side.

BRIEF DESCRIPTION OF THE DRAWINGS

FIG. 10 A diagram illustrating an example of a motion vector correction process in a dynamic image distribution method according to the third exemplary embodiment of the present invention.

DETAILED DESCRIPTION OF THE PREFERRED EMBODIMENTS

Next, preferred embodiments of the invention will be described in detail with reference to drawings. In the description below, unless it is explicitly stated otherwise, regarding a part related to contents in detail of a dynamic image coding technology, an example of processing conforming to H.264 is described.

(First Exemplary Embodiment)

Figure 1:
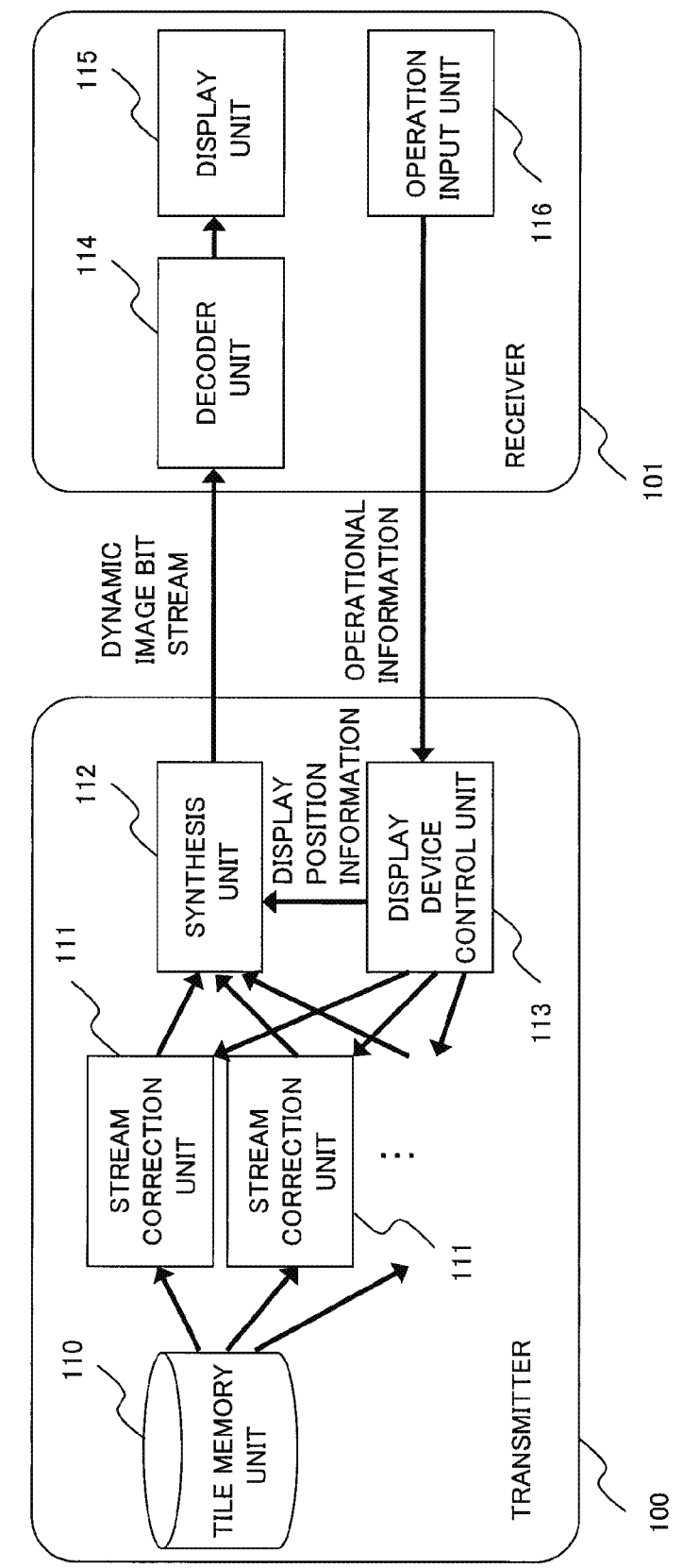
FIG. 1 A block diagram showing a configuration of a dynamic image distribution system according to a first exemplary embodiment of the present invention.
Figure 2:
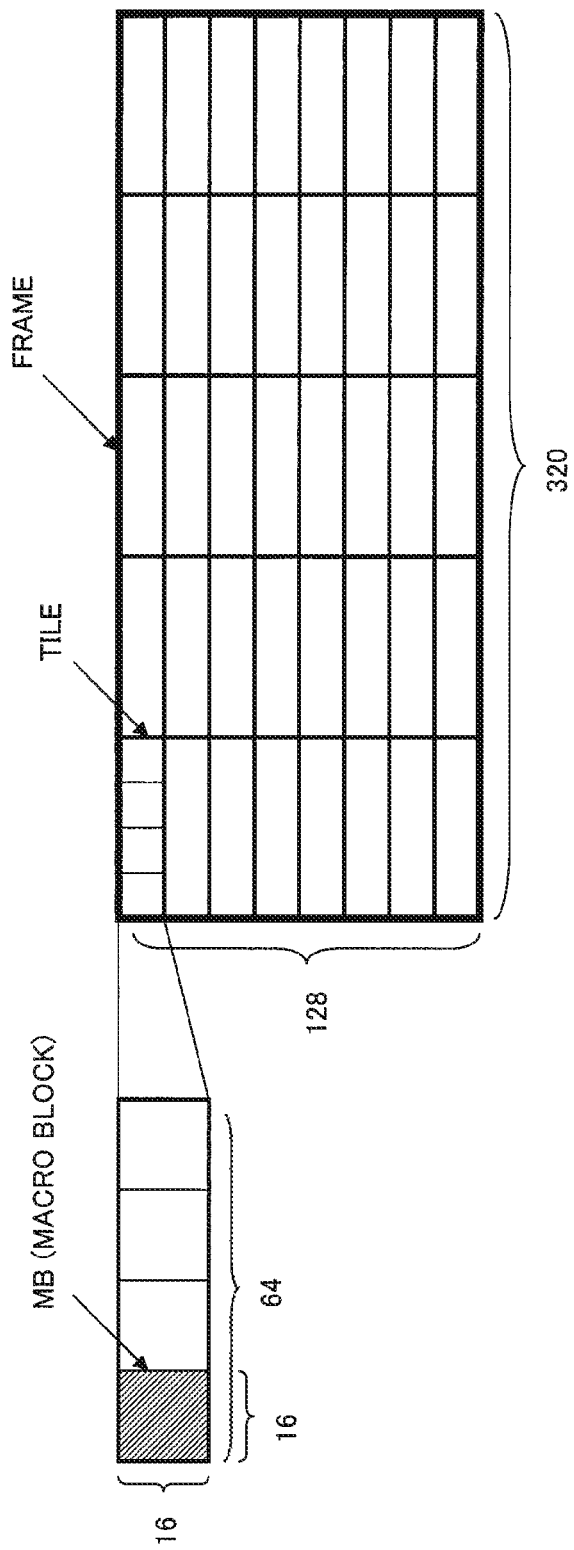
FIG. 2 A diagram illustrating image management in the first exemplary embodiment of the present invention.

A first exemplary embodiment of the present invention will be described with reference to FIGS. 1 to 5. FIG. 1 shows an example of a configuration of a dynamic image distribution system according to a first exemplary embodiment of the present invention. FIG. 2 describes an example of a management method of image information in the first exemplary embodiment of the present invention.

Each frame of a compression-encoded dynamic image is divided into multiple partial regions and is managed, in the first exemplary embodiment of the present invention with reference to FIG. 2. In this specification, this partial region is called a tile. In compression coding of a dynamic image, a frame of image is divided into blocks with a size of 16×16 pixels and coding processing is performed. A block of these 16×16 pixels is a unit for coding processing called a macro block (referred to as MB, in the following). As shown in FIG. 2, the tile includes a set of one or more MBs, and one or more tiles are collected and configure a frame of image. FIG. 2 shows an example of a case where one tile includes four consecutive MBs in a horizontal direction, and one frame includes 5 (horizontal)×8 (vertical) tiles. In this case, the size of one tile is 64×16 pixels and the size of one frame is 320×128 pixels.

Here, the MBs included in one tile are coded so as to be decoded without referring to encoded information on other MBs which are not included in this tile. The encoded information, here, is a pixel value of the decoding result, a pixel value at a corresponding position in a frame of the past decoding result, a MB coding mode, a motion vector and an intra prediction mode. In decoding of MB, encoded information on other MBs included in the same tile may be referred to. As a result, a decoding process is possible in each tile independently of other tiles. The MB is coded so that a pixel value of a tile other than the tile, which is at the same position in other images, is not used for motion correction. Accordingly, a decoding process is possible only with the tiles at the same position including the interframe prediction. In H.264, the processing which restricts a value of a motion vector so as not to refer to the pixel value outside the tile in the motion correction processing, while coding each tile as a separate slice, corresponds to such coding. However, such restriction of coding leads to deterioration of the compression efficiency. In particular, when a decoding process is made possible independently in a unit of MB, a compression process which uses the temporal and spatial correlation between the adjacent MBs cannot be performed, and the compression efficiency falls largely. Furthermore, in the case of H.264, since management information such as a slice header needs to be added for every MB, a compression efficiency fall by the overhead is large. In the present invention, one or more MBs are collectively managed as a tile. As a result, the compression, which uses the temporal and spatial correlation between the adjacent MBs, functions effectively in the tile. The number of pieces of the management information such as a slice header may be one for one tile. For this reason, an overhead becomes small and the fall in the compression efficiency is suppressed. The magnitude of the compression efficiency fall is controllable by varying the number of MBs stored in a tile.

Furthermore, any one of two kinds of mode of an I tile and a P tile is used for coding of each tile. Here, the I tile is data coded considering all MBs included in a tile as intra MBs like the I picture of usual dynamic image coding. And the P tile is data coded by allowing intermixture of the intra MB and an inter MB like the P picture. Although the I tile can be decoded independently like a case of the usual dynamic image without referring to the past decoding result, the coding efficiency thereof is not high. On the other hand, although the P tile needs to be decoded referring to the past decoding result, the coding efficiency is higher than that of the I tile.

The configuration of the dynamic image distribution system 1 according to the first exemplary embodiment of the present invention will be described with reference to FIG. 1. In the first exemplary embodiment of the present invention, the dynamic image distribution system includes a transmitter 100 and a receiver 101. The transmitter 100 includes a tile memory unit 110, one or more stream correction units 111, a synthesis unit 112 and a display position control unit 113. The receiver 101 includes a decoder unit 114, a display unit 115 and an operation input unit 116. The tile memory unit 110 stores a bit stream of each compression-encoded tile. Henceforth, a bit stream including a tile group stored in the tile memory unit 110 is called a former stream, and a picture frame included in the former stream is called a former frame. The stream correction unit 111 inputs a bit stream of a desired tile from the tile memory unit 110 based on control from the display position control unit 113, and performs a correction process for a part of the bit stream if the correction process is needed, and outputs it to the synthesis unit 112. The synthesis unit 112 synthesizes a bit stream of one or more inputted tiles, generates a frame of bit stream (henceforth, called a synthesized frame) and records display position information in the bit stream of the synthesized frame based on display position information from the display position control unit 113, and transmits the bit stream. The display position control unit 113 manages a display region based on operation information inputted from the receiver 101, supplies information on a required tile to the stream correction unit based on the display region and supplies display position information to the synthesis unit 112. The decoder unit 114 receives a dynamic image bit stream transmitted from the transmitter 100, and performs a decoding process, and outputs an image of a decoding result to the display unit 115. The display unit 115 displays the image of a decoding result on a screen or the like. The operation input unit 116 accepts a user operation of a display region setting, display region change or the like, and sends the input by the user operation to the transmitter 100.

Figure 3:
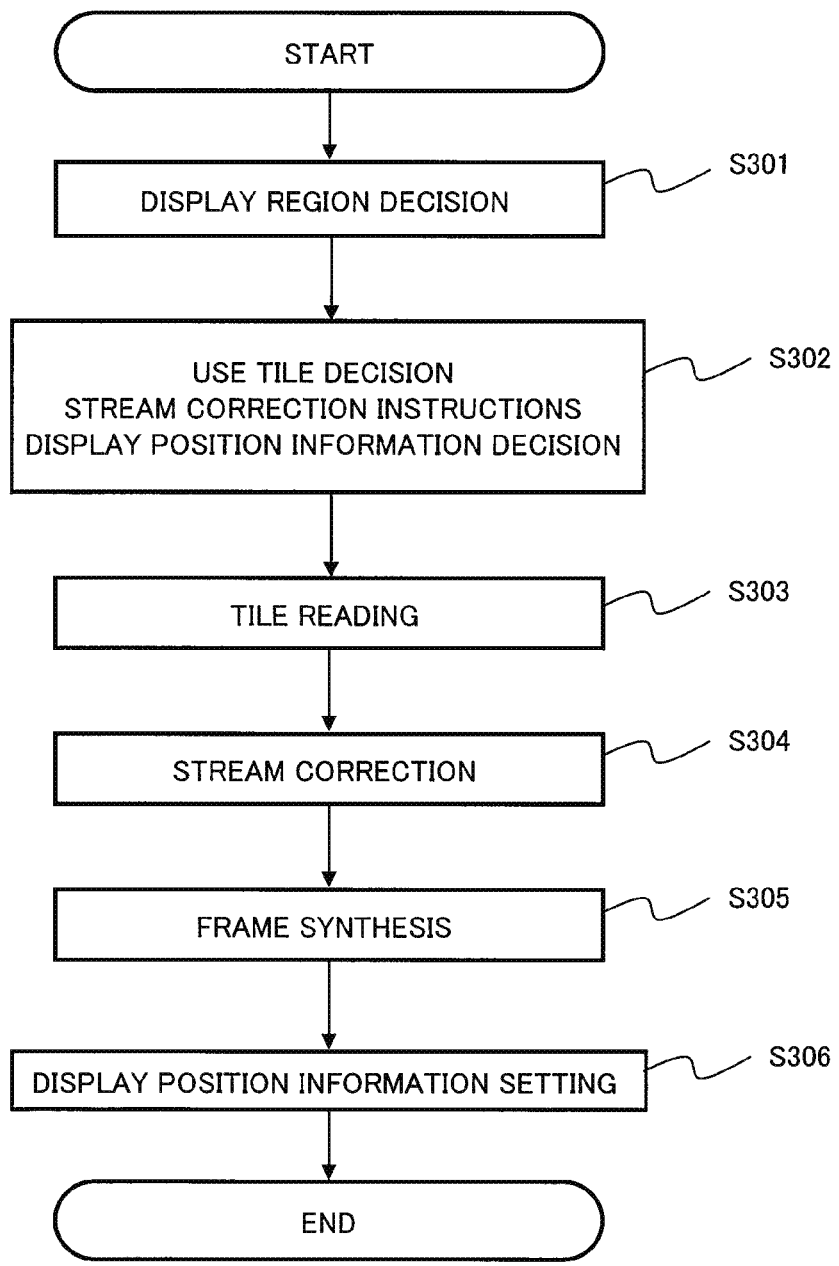
FIG. 3 A flow chart showing a dynamic image distribution method according to the first exemplary embodiment of the present invention.
Figure 4:
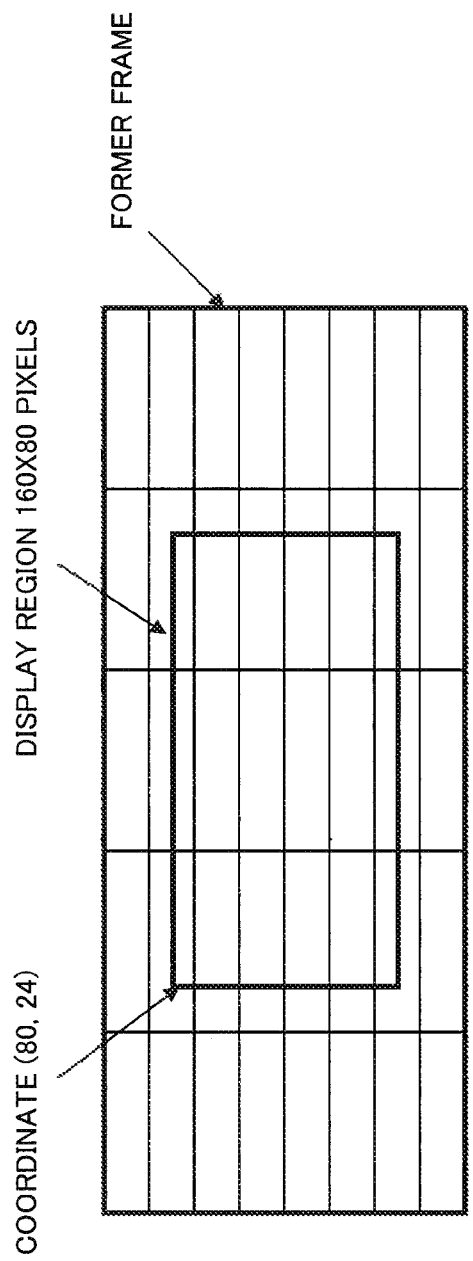
FIG. 4 A diagram illustrating an example of processing in a dynamic image distribution method according to the first exemplary embodiment of the present invention.
Figure 5:
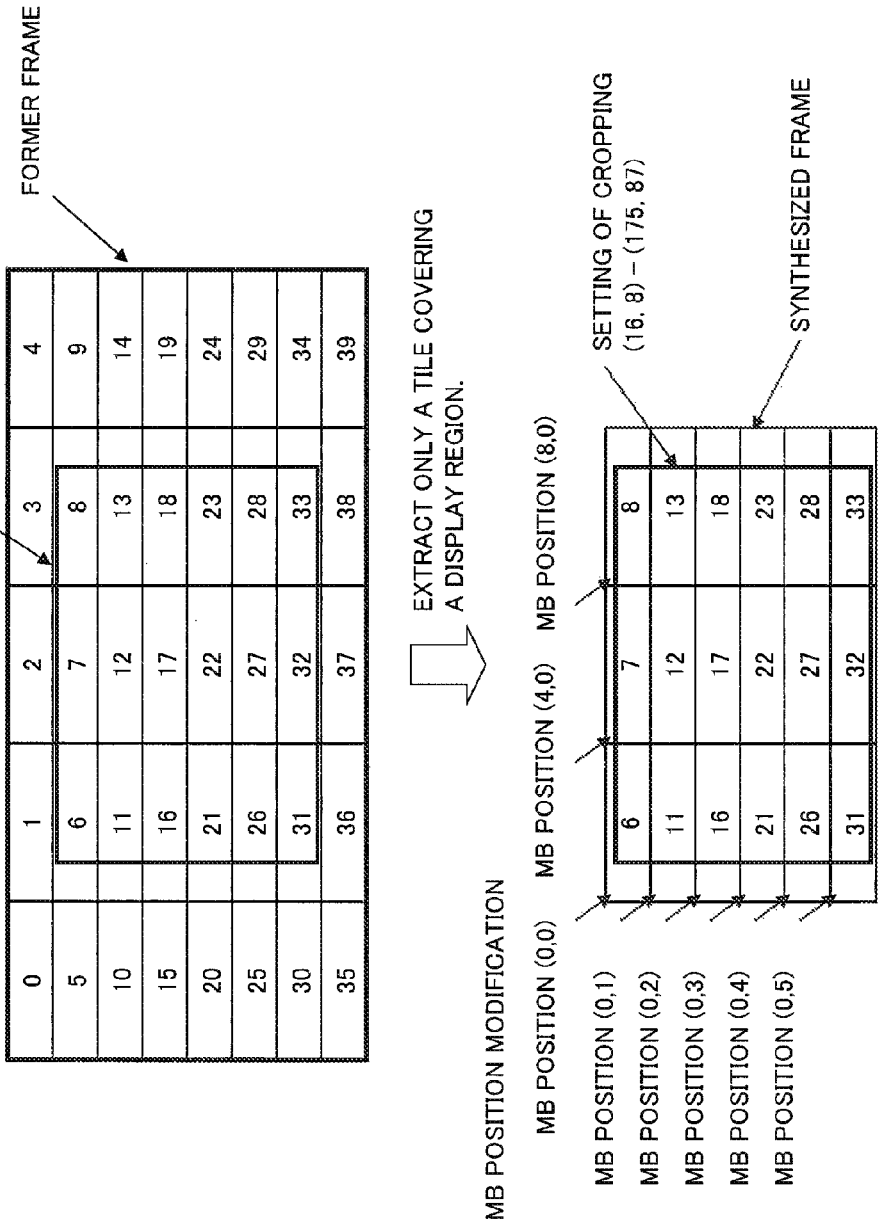
FIG. 5 A diagram illustrating an example of processing in a dynamic image distribution method according to the first exemplary embodiment of the present invention.

Next, a dynamic image distribution method according to the first exemplary embodiment of the present invention is described referring to a flow chart of FIG. 3. The display position control unit 113 determines a desired display region based on operation information from the receiver 101 and the past display position information (Step S301). The operation input unit 116 of the receiver 101 accepts an input operation which instructs to move the display region to left and right or upper and lower, for example, from the user, and sends the operation information to the transmitter 100. According to this operation information, next, the display position control unit 113 moves the position of the display region of a picture frame to be transmitted to the receiver to left and right or upper and lower. FIG. 4 shows an example of a processing which cuts out an area of 180×80 pixels in the frame center, and regenerates it. FIG. 5 shows a processing in the transmitter 100. The display position control unit 113 determines a minimum tile group needed to cover an area for display region information shown in FIG. 4 (Step S302 of FIG. 3). When a number (referred to as a number of tile, in the following) is assigned to each tile according to the raster scan order as shown in FIG. 5, tiles required to cover the display region are 18 tiles which are assigned numbers of 6, 7, 8, 11, 12, 13, 16, 17, 18, 21, 22, 23, 26, 27, 28, 31, 32 and 33. Then, the display position control unit 113 instructs the stream correction unit 111 to extract these eighteen tiles. Furthermore, when a synthesized frame is configured by these eighteen tiles, a position of a tile in the synthesized frame is different from the position in the former frame. For example, although the tile No. 6 was at the position of one tile to the right and one tile to the lower based on the point of the top-left corner in the former frame, it is at the position of the top-left corner in the synthesized frame configured by eighteen tiles. Accordingly, the display position control unit 113 instructs the stream correction unit 111 to correct a position of a tile in the frame (Step S302). Corresponding to this processing, each tile is coded as one slice in H.264, and a position of the tile is specified by a value of first_mb_in_slice in the slice header. This value is a value corresponding to a coordinate in the frame of the MB stored in the head of the slice. Therefore, for example, the value of the first_mb_in_slice is corrected so that the coordinate of the head MB for the tile No. 6 is (0, 0) and the coordinate of the head MB for the tile No. 7 is (4, 0). According to the first exemplary embodiment of the present invention, the stream correction unit 111 reads a bit stream of a required tile from the tile memory unit 110 based on the directions from the display position control unit 113 (Step S303) and performs a stream correction process instructed by the display position control unit 113 (Step S304), and outputs a result thereof to the synthesis unit 112. Further, in the first exemplary embodiment of the present invention, it is supposed that only the I tile, which does not use the past image information, is read. The synthesis unit 112 configures a frame of bit stream from the bit stream of the inputted tile (Step S305). The synthesized frame configured from the tile group (eighteen tiles in the example of FIG. 5) required to cover the display region may become larger than the desired display region as can be seen from the example of FIG. 5. Then, the display position control unit 113 determines information on a display position in the synthesized frame (Step S302), and supplies it to the synthesis unit 112. In the example of FIG. 5, when displaying a central area of 160×80 pixels among the synthesized frame of 192×96 pixels formed in the synthesis unit 112, it becomes the desired display. The synthesis unit 112 records display position information in a bit stream of the synthesized frame based on the display position information supplied from the display position control unit 113 (Step S306). In the case of H.264, desired display position information is recorded in frame_cropping_flag, frame_crop_left_offset, frame_crop_right_offset, frame_crop_top_offset and frame_crop_bottom_offset of seq_parameter_set_rbsp ( ) by setting an appropriate value so that a rectangular area which makes the coordinates (16, 8)-(175, 87) a diagonal may be displayed.

According to the first exemplary embodiment of the present invention, only a minimum tile group needed to cover a desired display region among tiles which configure a compression-encoded former frame is extracted, and a frame of bit stream is synthesized and then sent to the receiver. For this reason, viewing of the dynamic image of the specified area, which was set, can be realized without unnecessarily consuming a transmission path band. Furthermore, since the bit stream of the synthesized frame is a usual compression-encoded bit stream, the decoder unit 114 and the display unit 115 of the receiver may be identical with a decoding unit and a display unit widely used for a usual dynamic image delivery, and viewing of a specified area can be realized without largely changing the receiver. Furthermore, in the transmitter, only processing of reading a bit stream of a required tile, correcting position information in the frame and synthesizing to one frame is needed. For this reason, the dynamic image distribution method according to this exemplary embodiment can be realized with a small amount of processing. In particular, if it is compared with the method in which a whole original dynamic image is decoded, an image to be viewed is cut from non-compressed image of the decoding result, and the coding processing is performed for the image of the area thereof, it can be realized with a quite small load.

(Second Exemplary Embodiment)

Next, a second exemplary embodiment of the present invention will be described with reference to FIG. 6 and FIG. 7. The configuration of the system and the operation flow are similar to the first exemplary embodiment of the present invention.

Figure 6:
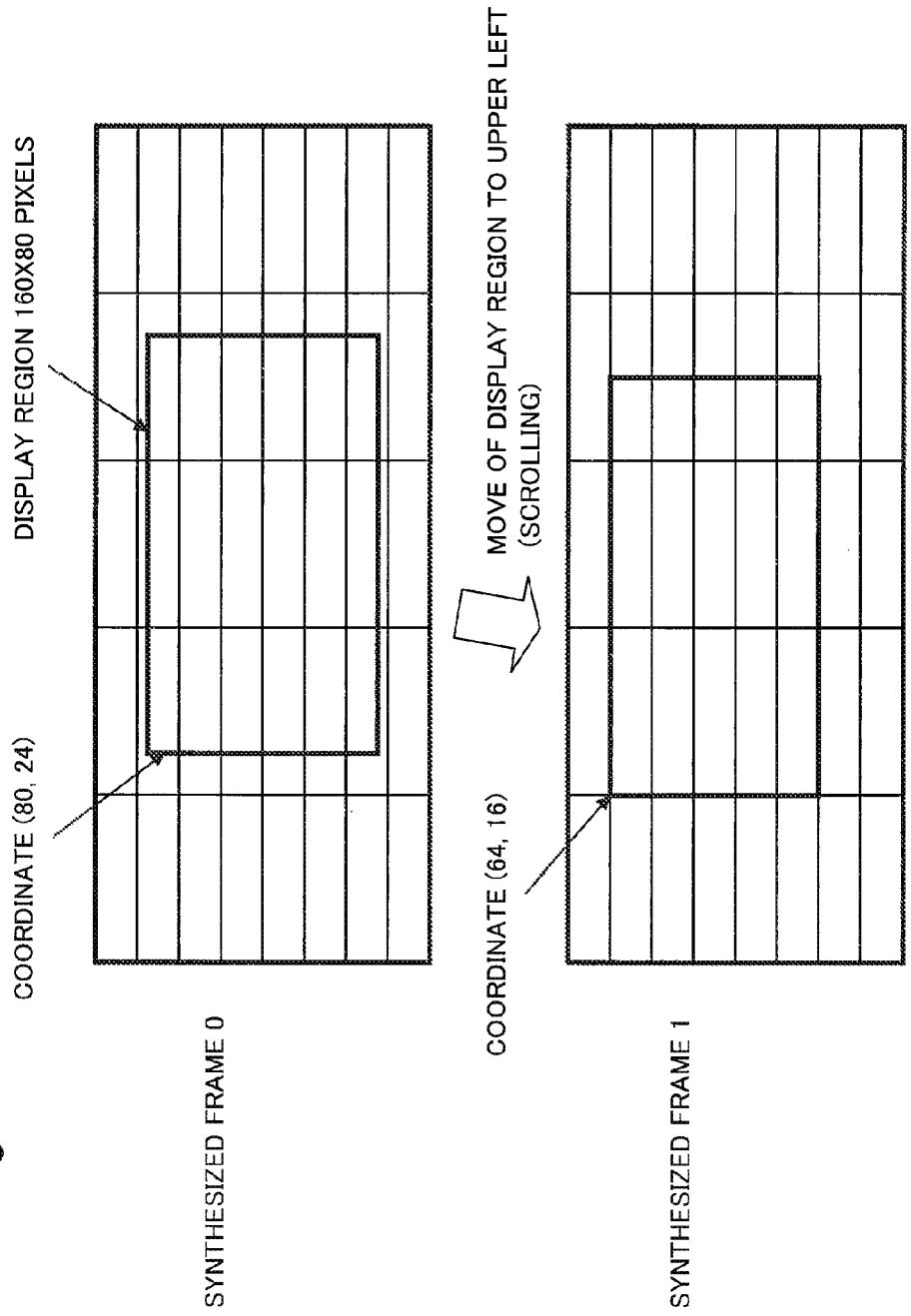
FIG. 6 A diagram illustrating an example of processing in a dynamic image distribution method according to a second exemplary embodiment of the present invention.
Figure 7:
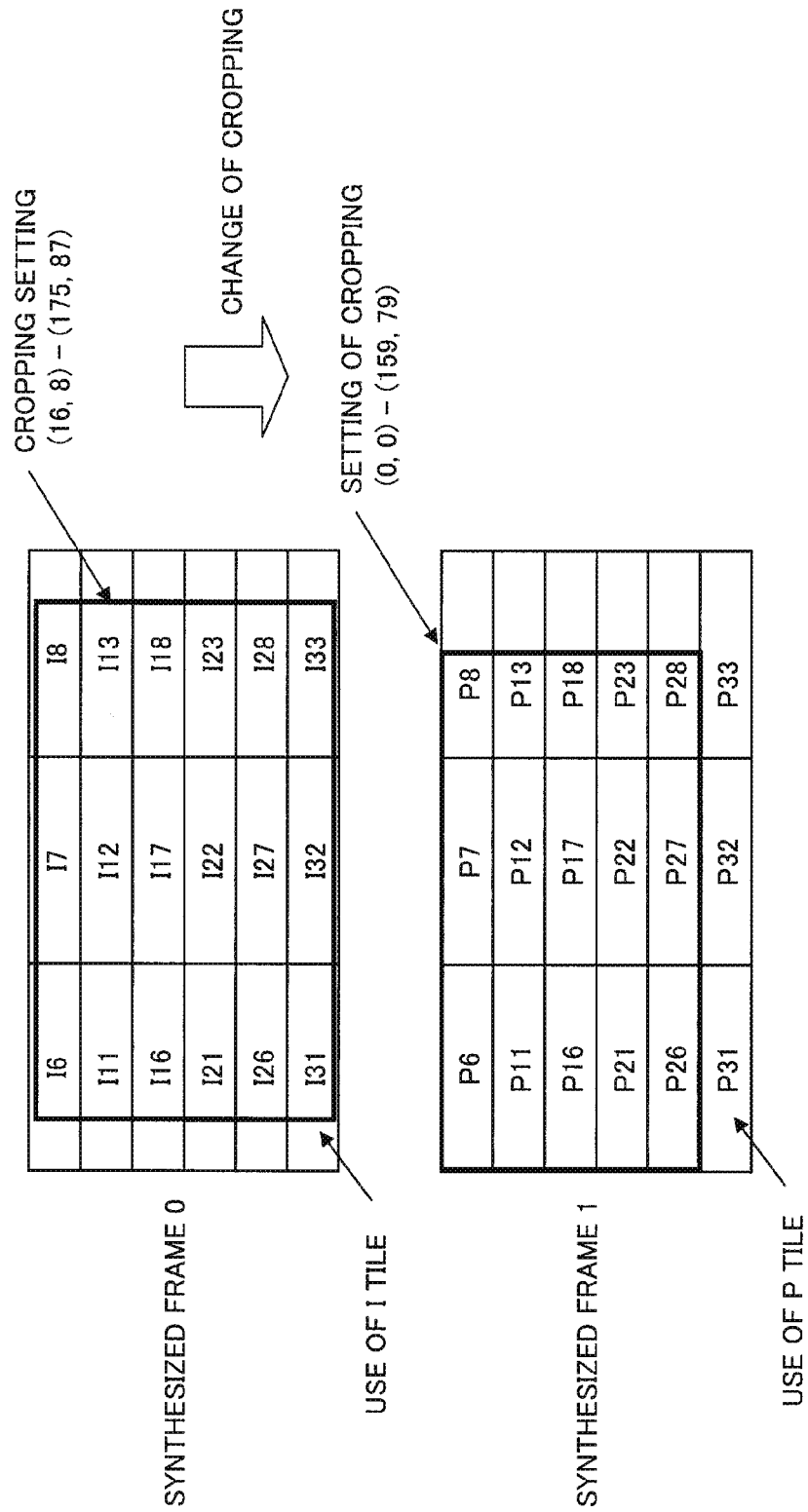
FIG. 7 A diagram illustrating an example of processing in a dynamic image distribution method according to the second exemplary embodiment of the present invention.

Here, FIG. 6 shows an example of processing which displays an area of 160×80 pixels of the center of a frame in the head synthesized frame 0, and moves a display region to the upper left based on operation from the receiver in the next synthesized frame 1. FIG. 7 shows processing in the transmitter 100. The processing, which determines a minimum tile group needed to cover a display region, is similar to the first exemplary embodiment. In this example, even if the display region scrolls, because the configuration of the tile group which covers it does not change, the synthesized frame 0 and the synthesized frame 1 use eighteen tiles which were assigned numbers of 6, 7, 8, 11, 12, 13, 16, 17, 18, 21, 22, 23, 26, 27, 28, 31, 32 and 33. FIG. 7 shows its coding mode as well as the number of the tile. The I12, for example, is an I tile at the twelfth position in the former frame, and the P28 is a P tile at the twenty-eighth position in the former frame. Because there is no image data which is already decoded before it in the synthesized frame 0, the interframe prediction is not performed and the frame includes only I tiles. In contrast, because the synthesized frame 1 can use an image of the decoding result of last synthesized frame 0, a frame can be composed by a P tile which performs the interframe prediction. Here, because the MB included in a certain tile as mentioned above is coded so that it can be decoded only with reference to the information on the MB included in the tile at the same position, the tile P6 refers to only the tile I6 in the interframe prediction, for example. Display position information set in Step S306 on FIG. 3 is different in the synthesized frame 0 and the synthesized frame 1 so that it may correspond to a display region moving in the synthesized frame 0 and the synthesized frame 1. That is, while display position information is set so that a rectangular area which makes the coordinate (16, 8)-(175, 87) a diagonal is displayed in the synthesized frame 0, display position information is set so that a rectangular area which makes the coordinates (0, 0)-(159, 79) a diagonal is displayed in the synthesized frame 1.

According to the second exemplary embodiment of the present invention, since a P tile which performs the interframe prediction is also used in addition to an I tile, compression efficiency improves. Furthermore, because response to moving (scrolling) of the display region is possible by change in the display position setting information, it can be realized in a small amount of processing.

(Third Exemplary Embodiment)

Next, a third exemplary embodiment of the present invention will be described with reference to FIGS. 8 to 11. The configuration of the system and the operation flow are similar to the first exemplary embodiment of the present invention.

Figure 8:
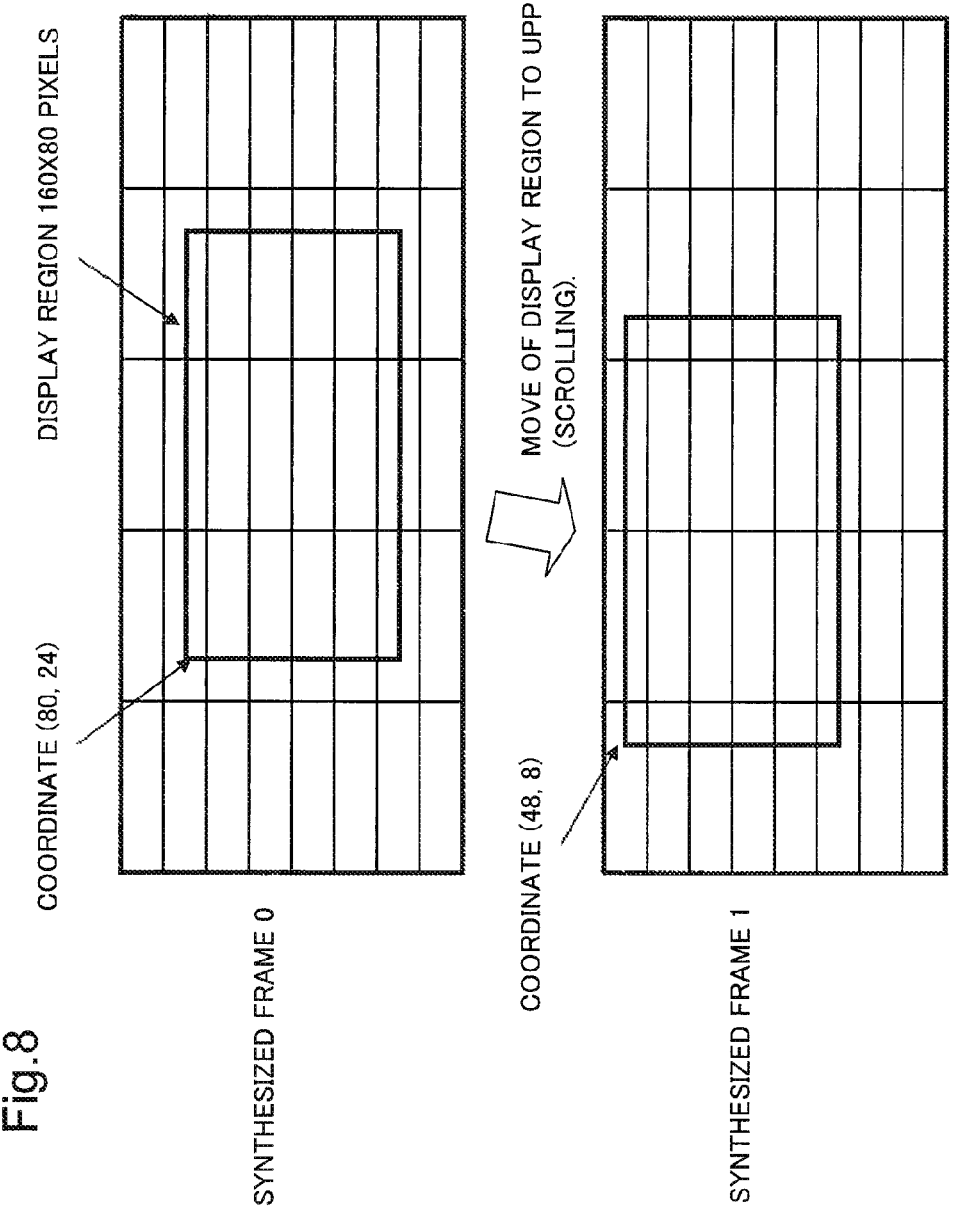
FIG. 8 A diagram illustrating an example of processing in a dynamic image distribution method according to a third exemplary embodiment of the present invention.
Figure 9:
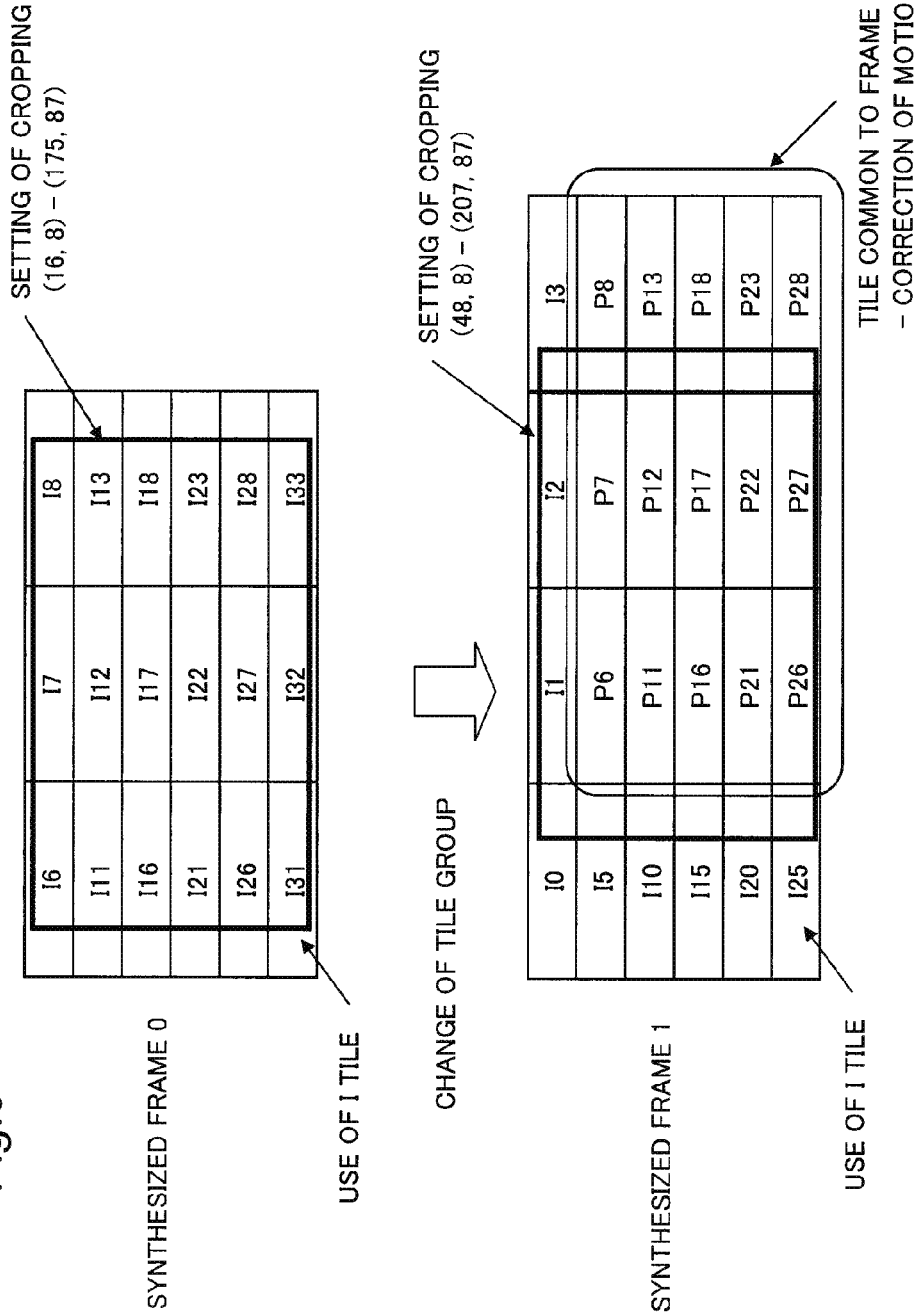
FIG. 9 A diagram illustrating an example of a processing in a dynamic image distribution method according to the third exemplary embodiment of the present invention.

FIG. 8 shows an example of processing which displays an area of 160×80 pixels of the center of the frame in the head synthesized frame 0 and moves (scrolls) a display region to the upper left further rather than the case of the example of FIG. 6 based on the operation from the receiver in the next synthesized frame 1. FIG. 9 shows processing in the transmitter 100. In this example, when the display region scrolls, a configuration of a tile group which covers the display region changes. That is, twenty-four tiles assigned numbers of 0, 1, 2, 3, 5, 6, 7, 8, 10, 11, 12, 13, 15, 16, 17, 18, 20, 21, 22, 23, 25, 26, 27 and 28, are used in the synthesized frame 1 after scrolling. Because the same numbers, that is, tiles at the same positions exist in the synthesized frame 0 for the tiles of the numbers of the 6, 7, 8, 11, 12, 13, 16, 17, 18, 21, 22, 23, 26, 27 and 28, the interframe prediction using an image of a decoding result can be used, and a P tile is used. On the other hand, an I tile is used for the tiles 0, 1, 2, 3, 5, 10, 15, 20 and 25, which are other than the above-mentioned tiles. This is because a tile does not exist at a corresponding position in the synthesized frame 0 for the tiles 0, 1, 2, 3, 5, 10, 15, 20 and 25, and the interframe prediction is unavailable. Furthermore, for the P tile, on the stream correction in the stream correction unit 111, in addition to the correction of the position of the tile, explained in the second exemplary embodiment, correction of the motion vector used for the interframe prediction is performed.

This correction of the motion vector will be described with reference to FIG. 10. FIG. 10 shows an example of vector correction by the tile of the number of tile 6. Four MBs are included in the tile P6 of the synthesized frame 1, and it is supposed that each has a motion vector 1001 as shown in FIG. 10. This motion vector is a motion vector which refers to a tile of the same position of the last frame, that is, a tile I0 of the synthesized frame 0. When there are no changes at a position of a tile on the synthesized frame, a normal motion correction interframe prediction can be performed by applying this motion vector just as it is, like an example shown by the second exemplary embodiment. However, as shown in FIG. 10, in the case that there is a change at the positions of the tile in the synthesized frame 0 and of the synthesized frame 1, when the motion vector 1001 is used for the interframe prediction as it is, a pixel data of a position, which is different from the original reference position, is referred to, and right interframe prediction processing cannot be performed. Accordingly, motion vector correction which deletes a position change in a tile on the synthesized frame is performed. In the example of FIG. 10, the component of the position displacement vector 1002 of the tile 6 is sixty-four pixels rightward and sixteen pixels downward. Accordingly, this tile position displacement vector 1002 is subtracted from each of an original motion vector 1001 and a correction motion vector 1003 is obtained. This correction motion vector is a result which synthesized a movement of an object for photographing of an image expressed by an original motion vector and a movement on the picture frame of each MB included in a tile, and by using this correction motion vector in motion correction, a right interframe prediction can be performed.

Figure 11:
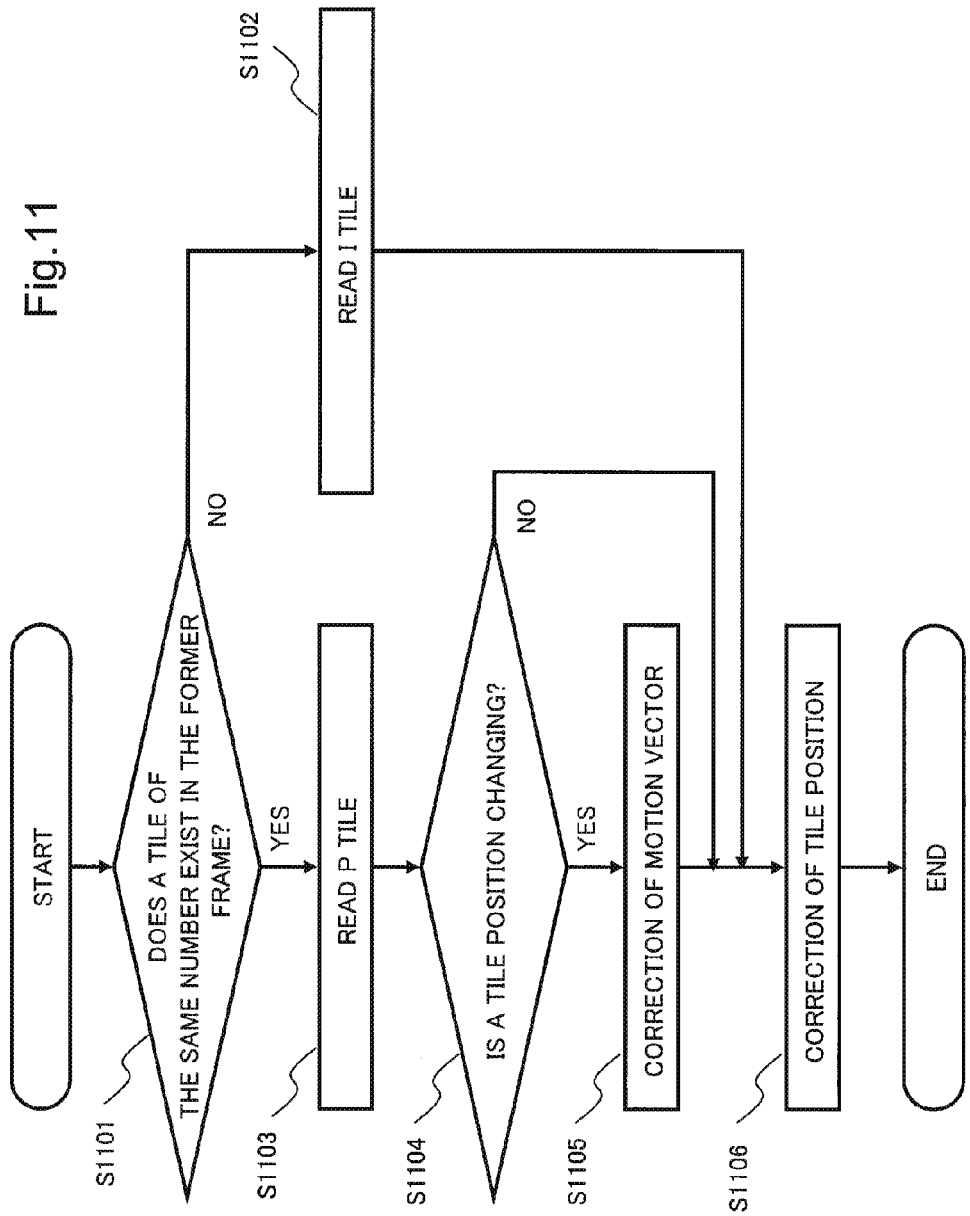
FIG. 11 A flow chart showing an example of a processing of tile reading and correction thereof in a dynamic image distribution method according to the third exemplary embodiment of the present invention.

FIG. 11 is a flow chart showing an example of a flow of tile reading and a stream correction process by which a display position control unit 113 and a stream correction unit 111 perform in cooperation in the first to the third exemplary embodiments of the present invention. The flow chart of FIG. 11 shows detailed processing of processing in Steps S303 and S304 in FIG. 3. First, it is determined whether a tile of the same number as the tile to read exists in the former synthesized frame referred to in interframe reference (Step S1101). Because the interframe prediction cannot be used when not existing, an I tile is read (Step S1102). When existing, a P tile is read in order to use the interframe prediction (Step S1103). When the P tile is used, it is further determined whether a position of a tile on the synthesized frame changes (Step S1104). When the position changes, a motion vector of each MB included in the tile is corrected (Step S1105). A motion vector correction process is as it has been described by the third exemplary embodiment with reference to FIG. 10. And in order to arrange the tile at an appropriate position in the synthesized frame, a tile position correction process is performed (Step S1106). Tile position correction has been described in the first exemplary embodiment.

According to the third exemplary embodiment of the present invention, even when the movement (scrolling) amount of the display region is large, a response is possible by change in the tile group used for a configuration of a synthesized frame, and a P tile using the interframe prediction can be used for a tile which also exists in the former synthesized frame. For this reason, a viewing range movement of a dynamic image can be realized, while high compression can be maintained. Furthermore, because a response is possible by motion vector correction even if a tile position on the synthesized frame changes, processing with a large load, such as a re-encoding of MB, is not necessary, and a viewing range movement of a dynamic image is possible in a small amount of processing.

(Fourth Exemplary Embodiment)

Figure 12:
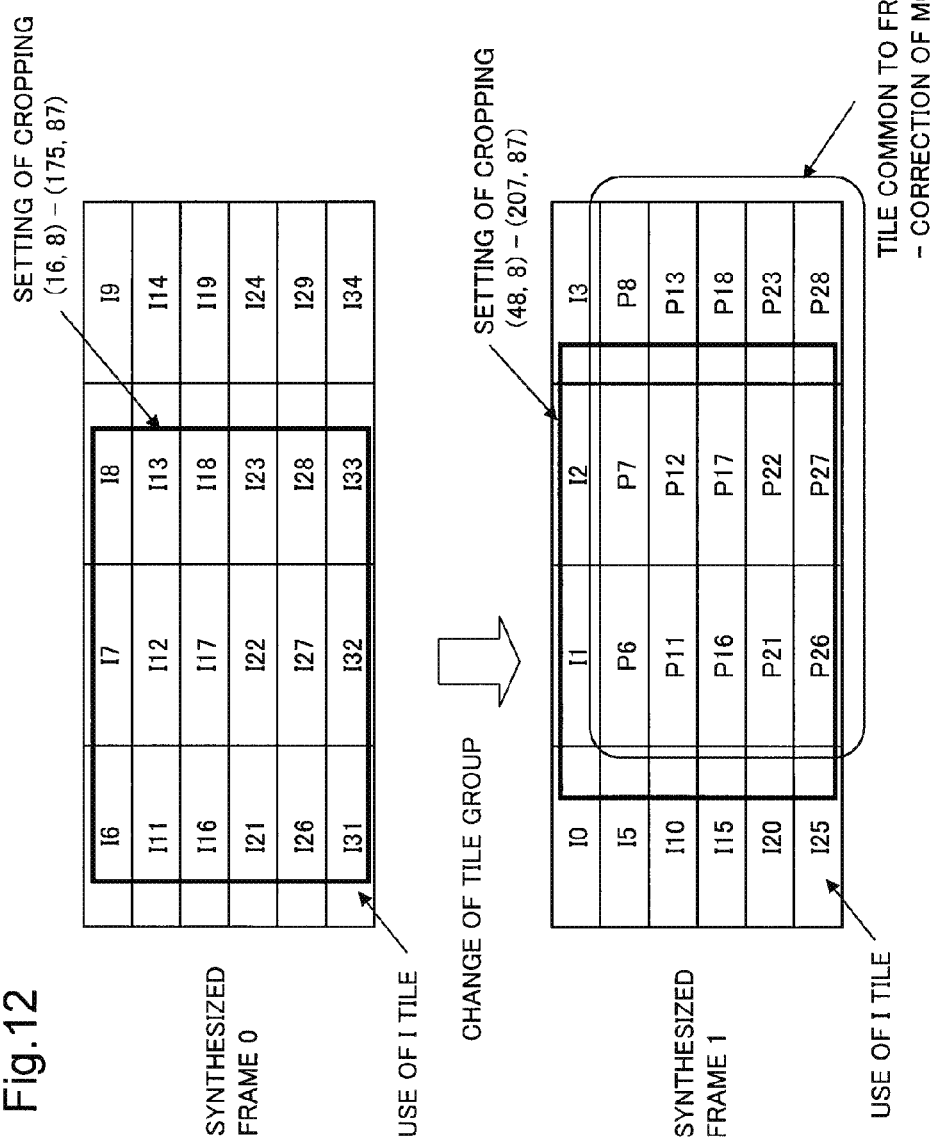
FIG. 12 A diagram illustrating an example of a processing in a dynamic image distribution method according to a fourth exemplary embodiment of the present invention.

Next, a fourth exemplary embodiment of the present invention will be described with reference to FIG. 12. The configuration of the system and the operation flow are similar to the third exemplary embodiment of the present invention.

Here, an example of processing when a display region movement shown in FIG. 8 is performed is shown as in the third exemplary embodiment. The configuration and the operation flow are the same as the third exemplary embodiment. However, decision processing (Step S302) of a tile group used for a configuration of a synthesized frame is different in the fourth exemplary embodiment. In the third exemplary embodiment, although only a minimum tile group needed to cover a display region was used, not only a minimum tile but also several tiles around it are used together in the fourth exemplary embodiment. When compared with the synthesized frame 0 of FIG. 9, a synthesized frame is composed including tiles I9, I14, I19, I24, I29 and I34 which are not included in a display region in a synthesized frame 0 of FIG. 12. In the fourth exemplary embodiment, when the number of pixels of width and length of a display region is set to DW and DH, and size of width and length of one tile is set to TW and TH, CEIL (DW/TW)+one piece (tile) in the lateral direction and CEIL (DH/TH)+one piece (tile) in the longitudinal direction are used. Here, CEIL (X) is a function that returns a minimum integer larger than or equal to X, that is, it revalues X to the minimum integer larger than or equal to X. Because the display region is DW=160 and DH=80, and the size of the tile is TW=64 and TH=16 in the example of FIG. 8, the number of tiles used for constituting the synthesized frame is:

CEIL (160/64)+1=four pieces in the lateral direction;

CEIL (80/16)+1=six pieces in the longitudinal direction.

And the total will be twenty-four pieces. This is a maximum value of the number of the tile to cover a display region including a moving range of the area. In FIG. 12, twenty-four tiles including a display region are used in each of the synthesized frame 0 and the synthesized frame 1 based on this.

According to the fourth exemplary embodiment of the present invention, since the number of tiles used for constituting the synthesized frame is determined from the size of the display region and the size of the tile, the size of the synthesized frame does not change by a position of a display region on the former frame. For this reason, even when a decoder unit or a display unit of a receiver cannot normally perform processing when frame size changes in the middle of the dynamic image bit stream, a viewing range movement of the dynamic image is possible.

(Fifth Exemplary Embodiment)

Next, a fifth exemplary embodiment of the present invention will be described with reference to FIG. 13 and FIG. 14. The configuration of the system and the operation flow are similar to the fourth exemplary embodiment of the present invention.

Figure 13:
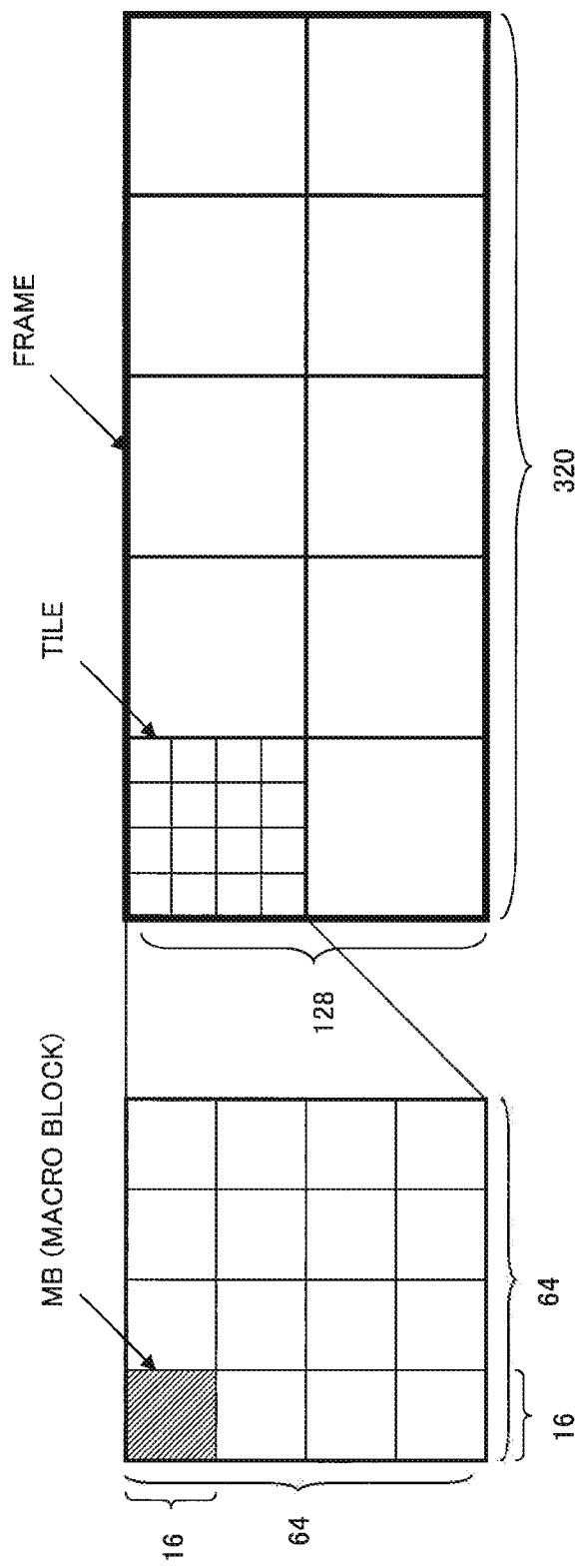
FIG. 13 A diagram illustrating image management in a fifth exemplary embodiment of the present invention.

FIG. 13 describes a method of management of image information in the fifth exemplary embodiment of the present invention. FIG. 2 showed an example of a management method of image information wherein one tile includes four consecutive MBs in a lateral direction. On the other hand, FIG. 13 shows an example of a management method of image information wherein one tile includes four MBs of the lengthwise direction and the transverse direction, that is, a total of 16 pieces. In this case, although the size of one frame is 320×128 pixels like FIG. 2, the size of one tile is 64×64 pixels, and one frame includes tiles of five pieces (transverse)×two pieces (lengthwise). In the first exemplary embodiment, since the decoding processing of each tile is performed independently of other tiles, H.264 codes each tile as a slice, and restricts a value of a motion vector so as not to refer to the pixel value outside the tile in motion correction processing. On the other hand, in this exemplary embodiment, decoding processing of each tile is performed independently of other tiles, similarly by a tile extending over a plurality of MB lines as shown in FIG. 13. For this reason, for example, processing is performed using a slice group in conformity with the processing by H.264. This will be described with reference to FIG. 14.

Figure 14:
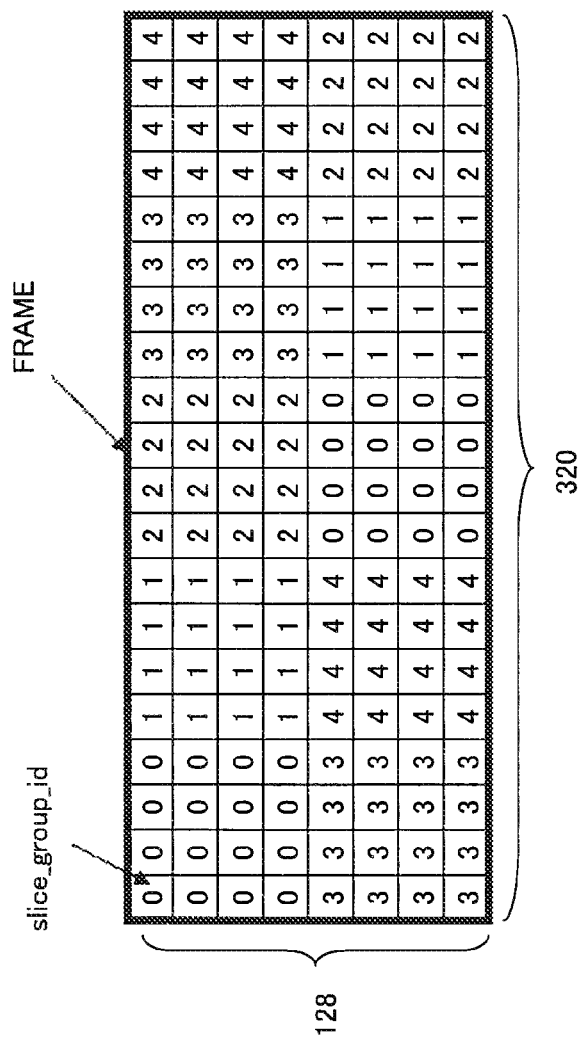
FIG. 14 A diagram illustrating image management in the fifth exemplary embodiment of the present invention.

FIG. 14 shows an example of slice_group_id allocation of each MB for realizing a tile configuration of FIG. 13. As shown in a FIG. 13, in this exemplary embodiment, different slice_group_id is assigned to a MB belonging to a tile which is different in the same MB line and MB sequence. When the MB which assigned the same slice_group_id is set as a different slice for every tile which it belongs, decoding processing is performed independently of other tiles in each tile.

According to the fifth exemplary embodiment of the present invention, the tile can be made to have a size so as to extend over a plurality of MB lines. Thereby, restriction to the motion vector value, for making decoding processing independently of other tiles possible, is eased in each tile, and the compression efficiency of each tile improves. A flexibility of setting of the shape of the tile is expanded.

(Sixth Exemplary Embodiment)

Next, a sixth exemplary embodiment of the present invention will be described with reference to FIG. 15 and FIG. 16. The configuration of the system and the operation flow are similar to the fifth exemplary embodiment of the present invention.

Figure 15:
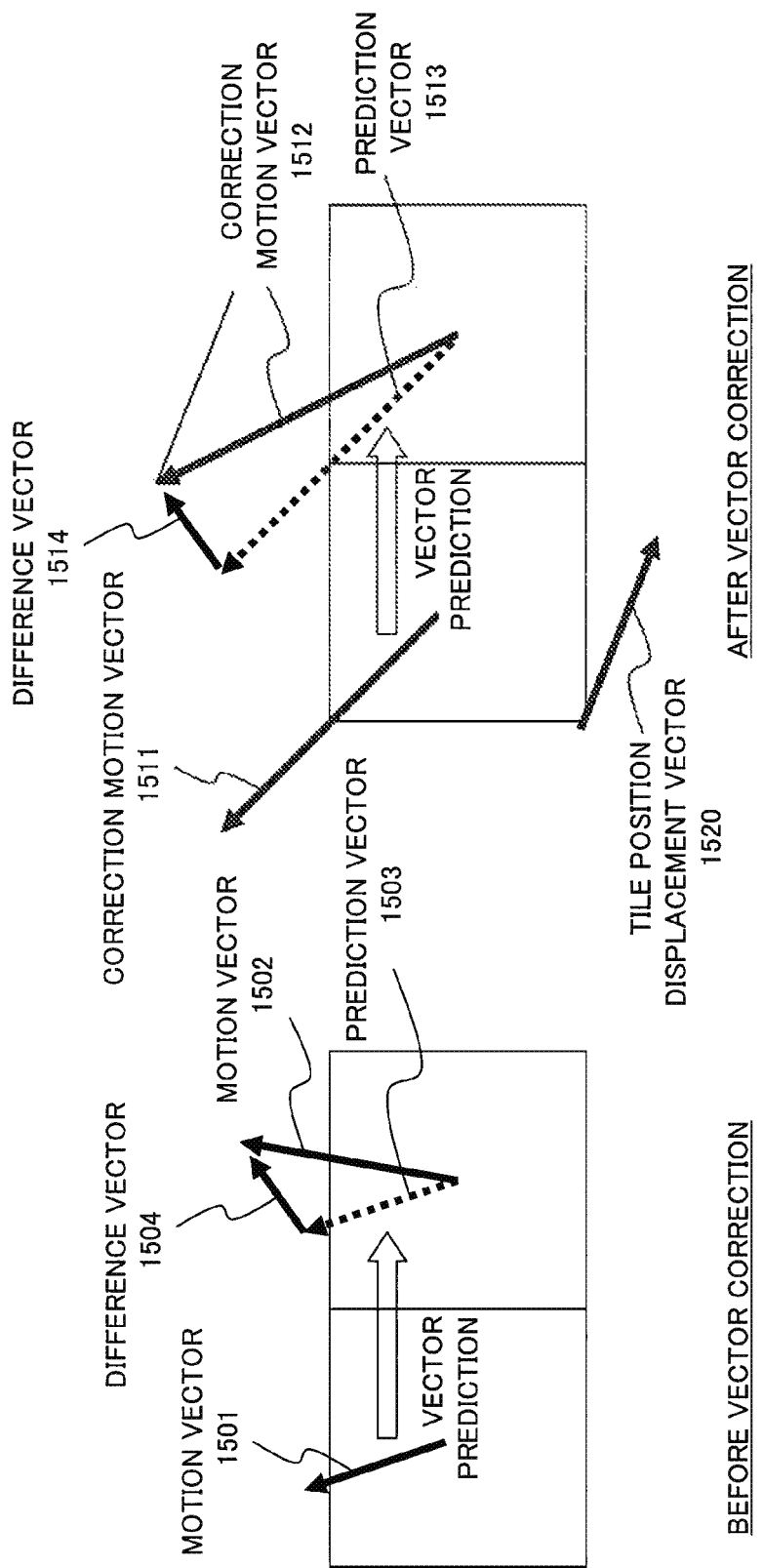
FIG. 15 A diagram illustrating an example of a motion vector correction process in a dynamic image distribution method according to a sixth exemplary embodiment of the present invention.

FIG. 15 shows an example of processing which corrects a motion vector in the stream correction unit 111. Motion vectors before vector correction of two MBs are shown by 1501 and 1502.

In a dynamic image coding method such as MPEG-2 and H.264, when a motion vector of a certain MB (referred to as current MB) is coded, information on the motion vector is not coded directly. A motion vector of current MB is predicted from information on a motion vector of the surrounding MB of its MB, and vector information on a difference between the prediction vector and the motion vector of the current MB is coded instead of being coded directly. By these processes, compression efficiency improves. As a prediction vector, a motion vector of the left side MB of the current MB or a median value of a motion vector of three MBs of the neighborhood is used.

In this exemplary embodiment, in FIG. 15, the motion vector 1502 is not coded just as it is, and a difference vector 1504 with a prediction vector 1503 obtained from the motion vector 1501 is coded. Here, when correction of a motion vector described using FIG. 10 in the third exemplary embodiment is performed, the motion vectors 1501 and 1502 will be corrected using tile position displacement vector 1520, and will be correction motion vectors 1511 and 1512. And the correction motion vector 1512 is not coded just as it is, and a difference vector 1514 with a prediction vector 1513 obtained from the correction motion vector 1511 is coded. At that time, because the difference between motion vectors 1501 and 1502 and that between correction motion vectors 1511 and 1512 are the same, difference vectors 1504 and 1514 before and after correction will be completely the same vector. For this reason, because the difference vector does not change for the motion vector 1502 even if corrected, correction of a bit stream is not necessary. Thus, when performing a motion vector correction process to a certain tile and correcting the bit stream corresponding to all motion vectors, even if a bit stream in other motion vectors is not corrected, the effect corrected by the mechanism of the motion vector prediction will be obtained.

Figure 16:
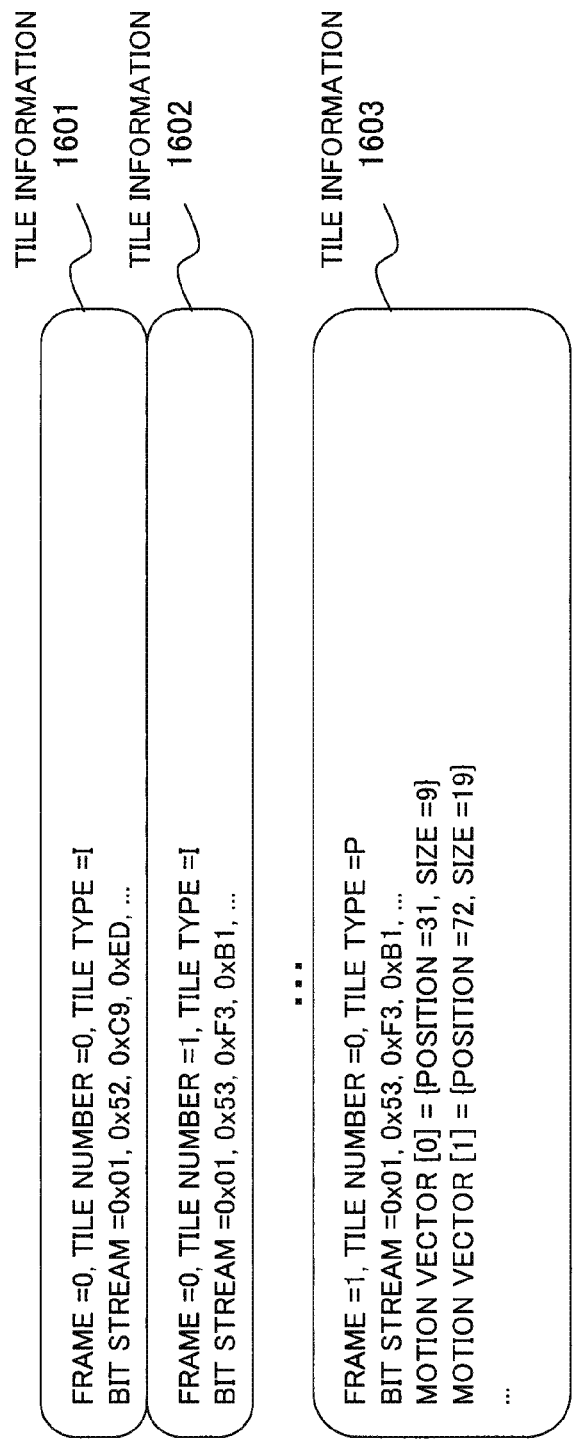
FIG. 16 A diagram illustrating an example of the tile information record form in the dynamic image distribution method according to the sixth exemplary embodiment of the present invention.

FIG. 16 shows an example of a configuration of tile information stored in the tile memory unit 110 in the sixth exemplary embodiment of the present invention. Each tile information includes a corresponding frame number, a number of tile, a coding type (I tile or P tile) of a tile and bit stream information on a tile. Tile information 1601 and tile information 1602 are examples of tile information on an I tile. Tile information 1603 on a P tile includes information on a bit stream, which requires correction in the case of a motion vector correction process, in addition to this. For example, it records only a required number of the position and the size in the bit stream in which motion vector information which needs bit stream correction is recorded. Further, this information does not need to be recorded on any motion vectors included in a tile necessarily as mentioned above. In a motion vector correction process in a stream correction unit 111, information on the above-mentioned bit stream of a vector, which needs a correction, among tile information on each tile is read and a predetermined correction process is performed.

According to the sixth exemplary embodiment of the present invention, because the correction process should not apply to all the motion vectors included in a tile, but should apply only to a vector requiring the correction, loads of a motion vector correction process is further reduced, and a viewing range movement of a dynamic image is possible in a small amount of processing.

As mentioned above, exemplary embodiment of the present invention has been described. Although the examples of implementation conforming to H.264 mainly was described in the above-mentioned exemplary embodiments, the present invention is not limited to only the application by H.264 method, and it can also be applied to other dynamic image coding method such as MPEG-2.

Furthermore, although an example when using the interframe prediction, has described a P tile which performs motion correction from one frame, a method of the interframe prediction is not limited to this, and it is also applicable easily to various interframe predictions such as a B tile which performs motion correction from two frames, multi frame motion correction using a plurality of frames, motion correction with a weight used in conjunction with weight addition of the pixel value and global motion correction.

Furthermore, in this exemplary embodiment, although an example of a dynamic image distribution system which transmits a dynamic image between the transmitter and the receiver has been described, a configuration is not limited to this, and a configuration of a motion picture playback apparatus including them is also considered of course.

Figure 17:
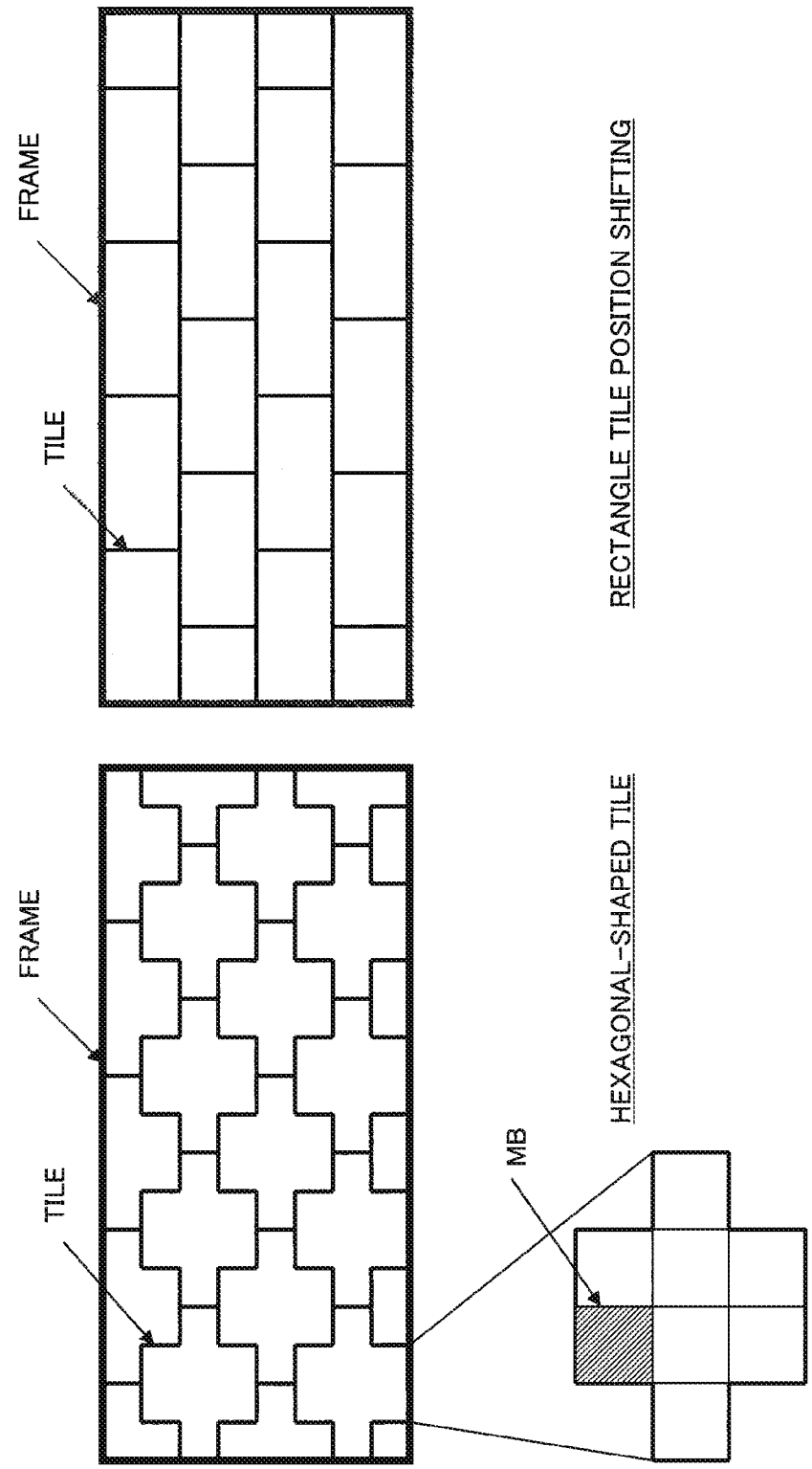
FIG. 17 A diagram illustrating another example of image management of the present invention.

Furthermore, in this exemplary embodiment, although the case where the shape of the tile was rectangular and the size of all tiles was uniform was explained as the example, the shape and the size thereof are not limited to this, and they may be applied to various tiles, such as a tile of a hexagonal shape, tiles of a rectangular shape where sizes are not the same, and tiles arranged so that boundary positions of rectangular tiles are shifted, as shown in FIG. 17. Furthermore, although the tile position and the correction of the motion vector have been described specifically for the stream correction, correction of information besides these may be needed by the standard of the dynamic image method, correction required to a configuration of a synthesized frame is performed at least. Furthermore, although a form of storing the tile information has been described only for the example of FIG. 16, it is not limited to this form. For example, in order to reduce a load of a correction process of a tile position, tile position information which needs correction, the position and the size of first_mb_in_slice in H.264 may be stored in advance. Furthermore, the method described above may be realized by making a computer read a program from a recording medium or a communication line and execute it.

This application is based upon and claims the benefit of priority from Japanese Patent Application No. 2010-245175 filed on Nov. 1, 2010, the disclosure of which is incorporated herein in its entirety by reference.

INDUSTRIAL APPLICABILITY

The present invention can be applied to a dynamic image distribution system enabling the arbitrary setting of a viewing range for compression-encoded dynamic images and the interactive modification of the viewing range.

DESCRIPTION OF THE REFERENCE NUMERALS 1 dynamic image distribution system
100 transmitter
101 receiver
110 tile memory unit
111 stream correction unit
112 synthesis unit
113 display position control unit
114 decoder unit
115 display unit
116 operation input unit
1001 motion vector
1002 tile position displacement vector
1003 correction motion vector
1501 motion vector
1502 motion vector
1503 prediction vector
1504 difference vector
1511 correction motion vector
1512 correction motion vector
1513 prediction vector
1514 difference vector
1520 tile position displacement vector
1601 tile information
1602 tile information
1603 tile information

What is claimed is:

1. A dynamic image distribution system for managing a compression-encoded dynamic image as a set of tiles including one or more macro blocks, the system comprising:
   a transmitter, comprising:
   a tile storage that stores a set of tiles configuring a dynamic image;
   one or more stream correctors that read a tile from the tile storage, perform a correction process, and output;
   a synthesizer that synthesizes a frame of dynamic image bit stream from the tile outputted from the stream correctors and transmits; and
   a display position controller that manages a display region in the dynamic image, and controls the stream correctors and the synthesizer based on the display region; and
   a receiver, comprising:
   a decoder that receives and decodes the dynamic image bit stream;
   a display that displays the dynamic image decoded by the decoder; and
   an operation inputter that inputs a user's operation, and transmits to the display position controller of the transmitter, wherein
   the stream correctors read a tile group corresponding to an imaging range including the display region, and perform a position information correction process yr the read tile for correcting a position of the tile in a frame including the tile group,
   the synthesizer records information showing a range of the display region in the frame including the tile group in the dynamic image bit stream,
   the tile is coded so as be decodable without using information on a tile at a different position in an image,
   the tile is coded by at least one coding of coding of an I tile, which is decodable without referring to other image information, and coding of a P tile, which decodes by performing interframe prediction using an image of a decoding result of a tile at the same position of other images,
   the stream correctors read either tile of an I tile or a P tile for each position of the tile included in the tile group, and
   the stream correctors read the P tile when an image used in the interframe prediction has been decoded, and the I tile when the image has not been decoded, for each tile included in the tile group.

2. The dynamic image distribution system according to claim 1, wherein the stream correctors, on reading the P tile, correct motion vector information on a macro block included in the P tile, when a tile position in the image used by the P tile in the interframe prediction is different from a position of the P tile in the frame including the tile group, so that a difference in the positions is deleted.

3. The dynamic image distribution system according to claim 1, wherein
   a display position is set to the display region,
   the stream correctors read tiles, a number of which is necessary to cover a range that the display region, to which the display position is set, can take, from tiles, a number of which is necessary to cover the display region.

4. The dynamic image distribution system according to claim 1, wherein
   the tile storage stores information for identifying a bit stream of a motion vector with a possibility that correction is required in a bit stream of the P tile, and
   the stream correctors correct only a motion vector, in which information for identifying a bit stream of the motion vector exists, using said information for identifying the bit stream of the motion vector.

5. The dynamic image distribution system according to claim 1, wherein the tile includes two or more macro block lines, and is coded as a slice in a slice group of a dynamic image coding method of H.264/MPEG-4 AVC.

6. A dynamic image distribution method for managing a compression-encoded dynamic image as a set of tiles including one or more macro blocks and distributing to a receiving side from a transmission side, the method comprising:
   in the transmission side,
   storing a set of tiles which configure a dynamic image;
   reading a stored tile, performing a correction process, and outputting;
   synthesizing a frame of dynamic image bit stream from the outputted tile, and transmitting; and
   managing a display region in the dynamic image; and
   in the receiving side,
   receiving and decoding the dynamic image bit stream;
   displaying the decoded dynamic image; and
   inputting a user's operation, and transmitting to the transmission side, wherein
   the reading a stored tile comprises reading a tile group corresponding to an imaging range including a display region, and performing a position information correction process for the read tile for correcting a position of the tile in a frame including the tile group,
   the synthesizing a frame comprises recording information showing a range of the display region in the frame including the tile group in the dynamic image bit stream,
   the tile is coded so as to be decodable without using information on utile at a different position in an image,
   the tile is coded by at least one coding f coding of an I tile, which is decodable with referring to other image information, and coding of a P tile, which decodes by performing interframe prediction using an image of a decoding result of a tile at the same position of other images, the reading a stored tile comprises reading either tile of an I tile or a P tile for each position of the tile included in the tile group, and the reading a stored tile comprises reading the P tile when an image used in the interframe prediction has beer decoded, and the I tile when the image has not been decoded, for each tile included in the tile group.

7. A non-transitory computer readable medium storing a program, causing a computer to execute a control process for managing a compression-encoded dynamic image as a set of tiles including one or more macro blocks and distributing to a receiving side from a transmission side, the control process comprising:

in a transmission side, storing a set of tiles which configure a dynamic image;

reading a stored tile, performing a correction process and outputting;

synthesizing a frame of dynamic image bit stream from the outputted tile, and transmitting; and managing a display region in the dynamic image; and in the receiving side, receiving and decoding the dynamic image bit stream;

displaying the decoded dynamic image; and inputting a user's operation, and transmitting to the transmission side, wherein the reading a stored tile comprises reading a tile group corresponding to an imaging range including a display region, and performing a position information correction process for the read tile for correcting a position of the tile in a frame including the tile group, the synthesizing a frame comprises recording information showing a range of the display region in the frame including the tile group in the dynamic image bit stream, the tile is coded so as to be decodable without using information on a tile at a different position in an image, the tile is coded by at least one coding of coding of an I tile, which is decodable without referring to other image information, and coding of a P tile, which decodes by performing interframing prediction using an image of a decoding result of a tile at the same position of other images, the reading a stored tile comprises reading either tile of an I tile or a P tile for each position of the tile included in the tile group, and the reading a stored tile comprises reading the P tile when an image used in the interframe prediction has been decoded, and the I tile when the image has not been decoded, for each tile included in the tile group.

* * * * *